US012033673B2

(12) United States Patent
Wang et al.

(10) Patent No.: US 12,033,673 B2
(45) Date of Patent: Jul. 9, 2024

(54) METHOD OF DATA CLEARING OF HARD DISK, APPARATUS, AND COMPUTER READABLE STORAGE MEDIUM APPLYING THE METHOD

(71) Applicant: Fulian Precision Electronics (Tianjin) Co., LTD., Tianjin (CN)

(72) Inventors: Yan Wang, Tianjin (CN); Jie Yuan, Tianjin (CN)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 0 days.

(21) Appl. No.: 18/132,832

(22) Filed: Apr. 10, 2023

(65) Prior Publication Data

US 2024/0134558 A1 Apr. 25, 2024

(30) Foreign Application Priority Data

Oct. 19, 2022 (CN) ......................... 202211281014.6

(51) Int. Cl.
*G11B 5/024* (2006.01)
*G06F 3/06* (2006.01)

(52) U.S. Cl.
CPC ............ *G11B 5/024* (2013.01); *G06F 3/0604* (2013.01); *G06F 3/0652* (2013.01); *G06F 3/0689* (2013.01)

(58) Field of Classification Search
None
See application file for complete search history.

(56) References Cited

U.S. PATENT DOCUMENTS

| | | | | |
|---|---|---|---|---|
| 5,579,475 | A * | 11/1996 | Blaum | H03M 13/11 714/6.32 |
| 6,662,263 | B1 * | 12/2003 | Wong | G11C 5/025 365/185.11 |
| 2010/0037022 | A1 * | 2/2010 | Chou | G06F 11/1076 711/E12.019 |
| 2011/0197025 | A1 * | 8/2011 | Okamoto | G11B 20/1879 711/E12.001 |
| 2016/0124661 | A1 * | 5/2016 | Kurita | G06F 3/0616 711/114 |
| 2017/0192865 | A1 * | 7/2017 | Pan | G06F 11/2094 |
| 2020/0043524 | A1 * | 2/2020 | Roberts | G06F 11/1088 |

FOREIGN PATENT DOCUMENTS

| | | |
|---|---|---|
| CN | 110737408 A | 1/2020 |
| CN | 115033182 A | 9/2022 |

* cited by examiner

*Primary Examiner* — Peter Vincent Agustin
(74) *Attorney, Agent, or Firm* — ScienBiziP, P.C.

(57) ABSTRACT

A method of data clearing of a hard disk comprises search a last target logic block of a target hard disk according to a predetermined sequence. Stored data in the target logic block is read for determining whether the stored data includes disk array information. The stored data of the target logic block is cleared while the stored data includes the disk array information. By accurately clearing minimum data, a data clearing process of the target hard disk is completed. By comparing with the full disk format manner, an effective of data clearing is improved. An apparatus and a computer readable storage medium applying the method are also disclosed.

19 Claims, 6 Drawing Sheets

METHOD OF DATA CLEARING OF HARD DISK, APPARATUS, AND COMPUTER READABLE STORAGE MEDIUM APPLYING THE METHOD

FIELD

The subject matter herein generally relates to computer technology.

BACKGROUND

While data clearing of a hard disk in redundant arrays of independent disks (RAID), a full disk format instruction is used for clearing all the data, thus the cleared hard disk may be normally used without being affected by the RAID. An effective of data clearing is low.

There is room for improvement in the art.

BRIEF DESCRIPTION OF THE DRAWINGS

Implementations of the present disclosure will now be described, by way of example only, with reference to the attached figures.

DETAILED DESCRIPTION

Figure 1:
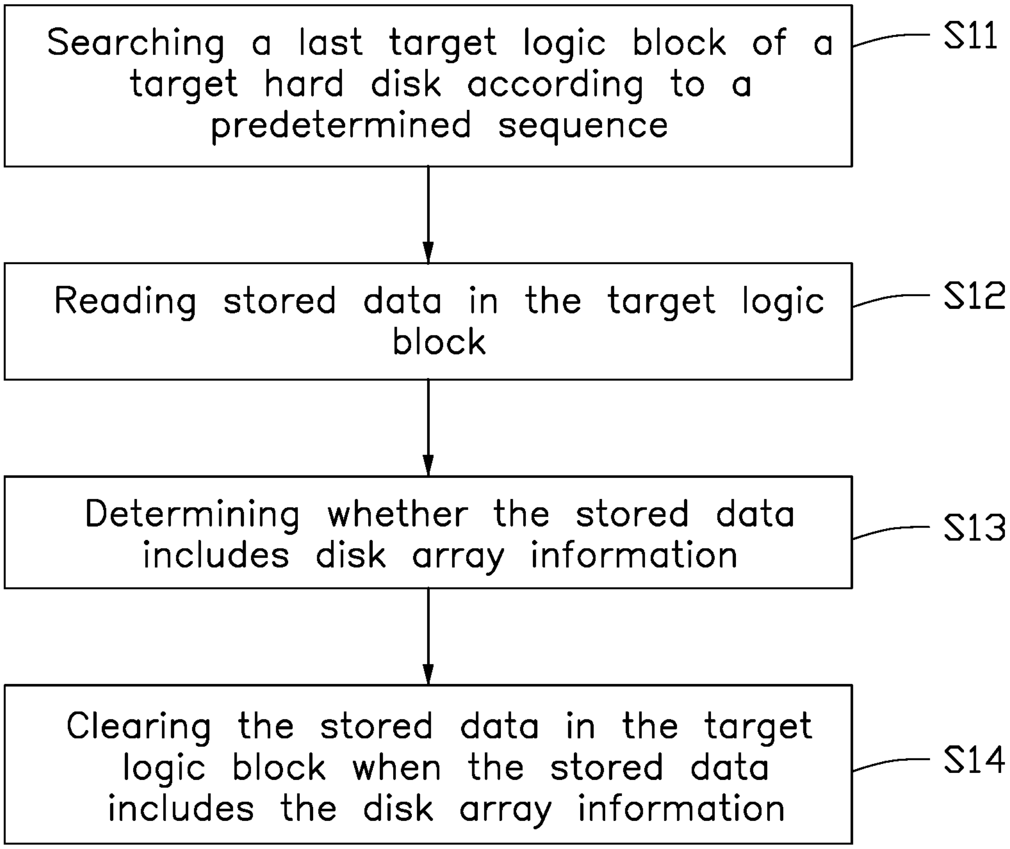
FIG. 1 is a flowchart illustrating a first embodiment of a method of data clearing of a hard disk according to the present disclosure.

The present disclosure is described with reference to accompanying drawings and the embodiments. It will be understood that the specific embodiments described herein are merely part of all embodiments, not all the embodiments. Based on the embodiments of the present disclosure, it is understandable to a person skilled in the art, any other embodiments obtained by persons skilled in the art without creative effort shall all fall into the scope of the present disclosure. It will be understood that the specific embodiments described herein are merely some embodiments and not all.

It will be understood that, even though the flowchart shows a specific order, an order different from the specific order shown in the flowchart can be implemented. The method of the present disclosure can include one or more steps or actions for achieving the method. The steps or the actions in the method can be interchanged with one another without departing from the scope of the claims herein.

In general, the word "module," as used herein, refers to logic embodied in hardware or firmware, or to a collection of software instructions, written in a programming language, for example, Java, C, or assembly. One or more software instructions in the modules may be embedded in firmware, such as an EPROM, magnetic, or optical drives. It will be appreciated that modules may comprise connected logic units, such as gates and flip-flops, and may comprise programmable units, such as programmable gate arrays or processors, such as a CPU. The modules described herein may be implemented as either software and/or hardware modules and may be stored in any type of computer-readable medium or other computer storage systems. The term "comprising" means "including, but not necessarily limited to"; it specifically indicates open-ended inclusion or membership in a so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one."

Terms "first", "second", and the like used in the specification, the claims, and the accompanying drawings of the present disclosure are used to distinguish different objects rather than describe a particular order. A term "comprise" and its variations are intended to cover a non-exclusive inclusion. For example, a process, method, system, product, or apparatus including a series of steps or units is not limited to the listed steps or units, and may optionally include other steps or units that are not listed, or other steps or units inherent to the process, method, product, or device.

It will be understood that, even though the flowchart shows a specific order, an order different from the specific order shown in the flowchart can be implemented. The method of the present disclosure can include one or more steps or actions for achieving the method. The steps or the actions in the method can be interchanged with one another without departing from the scope of the claims herein.

While data clearing of a hard disk in redundant arrays of independent disks (RAID), a full disk format instruction is used for clearing all the data, thus the cleared hard disk may be normally used without being affected by the RAID. An effective of data clearing is low. Therefore, a method of data clearing of a hard disk is described as below for improving the effective of data clearing.

FIG. 1 shows a flowchart of the method of data clearing of a hard disk, the method may comprise at least the following steps, which also may be re-ordered.

In block S11, a last target logic block of a target hard disk is searched according to a predetermined sequence.

In one embodiment, the hard disk is a data storage medium of a computer device, and is configured to store most computer programs and data being needed while a computer device normally work. The logic block is a data block stored in the hard disk. Each hard disk includes a plurality of logic blocks, and each logic block has an address for searching or overwriting. The foregoing predetermined sequence is a reading and writing sequence of the logic blocks after the targe hard disk is driven.

In one embodiment, the targe hard disk is connected with a host bus adapter (HBA) card of the computer device.

In one embodiment, while clearing the data of the target hard disk of the computer device, all the hard disks connected with the computer device is searched, and a disk letter of the target hard disk is acquired. The target hard disk can be searched by the acquired disk letter.

In one embodiment, a size of the logic block in the target disk may be set by a system of the computer device. For example, under a Linux system of the computer device, the size of the logic block may be set as 512 bytes. The size of the logic block in the target disk can be set by operating the system of the computer device by users, but not being limited.

In one embodiment, the foregoing target hard disk may include a magnetic disk. The magnetic divides a storage region into a plurality of logic blocks in a sequence from outer to inner according to physical sectors and a rotating direction. In the embodiment, an inner physical sector close to a center of the magnetic disk is the last target logic block of the target hard disk.

In block S12, stored data of the target logic block is read.

In one embodiment, after the last target logic block being found, the stored data of the target logic block is read.

In one embodiment, when the target hard disk is a magnetic disk, the magnetic disk locates the inner physical sector close to a center of the magnetic disk, thus the stored data of the target logic block is read.

In block S13, determining whether the stored data includes disk array information.

In the embodiment, the computer device may set a HBA card and/or a disk array card for connecting the hard disk as a controller of the hard disk. In an application scene of the computer device, a same target hard disk may be cross used by the HBA card and the disk array card. When the target hard disk forms a disk array volume by the disk array card, the target hard disk remains the disk array information, and a controlling operation of the target hard disk by other HBA cards and disk array cards may be affected due to the remained disk array information. Therefore, the data clearing of the hard disk is a major target.

In one embodiment, the disk array information included in the foregoing stored data is a part of a complete disk array information.

In one embodiment, the disk array information may include a target anchor header data in a predetermined magnetic data format. The predetermined magnetic data format is a magnetic data format proposed by storage networking industry association (SNIA).

In one embodiment, a detection for the target anchor header data is executed in the stored data, thus whether the stored data includes the disk array information can be determined. Further, whether the hard disk forms the disk array volume by the disk array card and whether the hard disk remains a complete disk array information are determined.

In block S14, the stored data of the target logic block is cleared while the stored data includes the disk array information.

In one embodiment, while the stored data includes the disk array information, there is a disk array volume formed by the target hard disk. The remained disk array information in the target hard disk affects the using of the target disk by other controllers. Therefore, while the disk array information in the target logic block is detected, the stored data of the target logic block is cleared, the complete disk array information is broken, and an availability of the complete disk array information is disabled. By accurately clearing minimum data, the data clearing process of the target hard disk is completed. By comparing with the full disk format manner, an effective of data clearing is improved.

In one embodiment, the process for clearing the stored data in the target logic block may include operations of delating and formatting the stored data in the target logic block through instructions, but not being limited.

Figure 2:
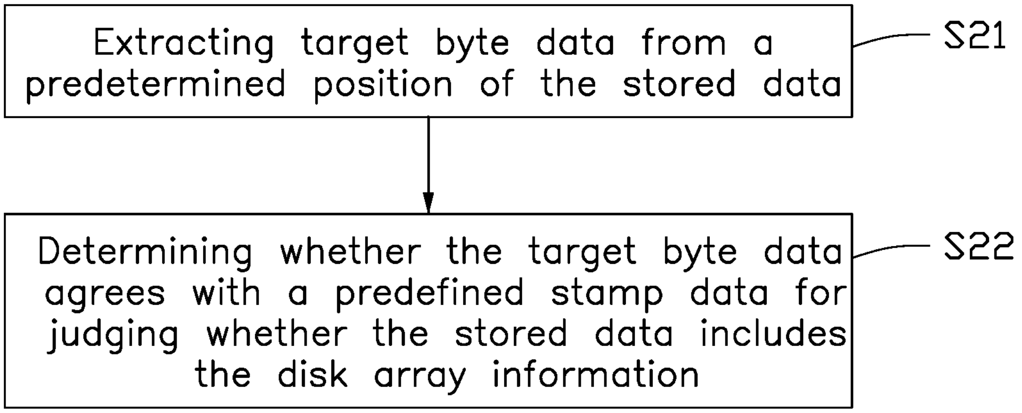
FIG. 2 is a detailed flowchart illustrating an embodiment of block S13 of the flowchart in FIG. 1 according to the present disclosure.

FIG. 2 shows a detail flowchart of the block S13. The block S13 further includes the following steps.

In block S21, target byte data are extracted from a predetermined position of the stored data.

In one embodiment, the disk array information can be a magnetic data format proposed by SNIA. In the magnetic data format, a specified archer header data is needed for addressing the stored position of the disk array information. After clearing the specified archer header data, the disk array information of the target hard disk is to be invalid, which is unable to identify by the computer system for affecting the using of the target hard disk.

The magnetic data format proposed by SNIA is a standard format of the disk array information. When the target hard disk establishes a disk array by the disk array card, the disk array information stored on the target disk array needs to be in the magnetic data format. While storing, the disk array information is stored at a last storing space of the target hard disk.

In the data instruction of the magnetic data formation proposed by SNIA, each region defines a global offset flag field. The specified archer header data is stored in a last accessible logic block of the target hard disk, which is the target logic block. By clearing the specified archer header data in the target logic block, the disk array information is invalid. While extracting the target byte data from the predetermined position corresponding to the specified archer header data is configured to determine whether the target byte data is the specified archer header data.

In one embodiment, the target byte data is the stored data from a first byte to a fourth byte in the stored data. In the target logic block, the first four bytes data is configured to store the specified archer header data. When the target byte data is the specified archer header data, it means that the target hard disk stores the disk array information.

In block S22, determining whether the target byte data agrees with a predefined stamp data for judging whether the stored data includes the disk array information.

In one embodiment, the predefined stamp data is global flag data in a standard magnetic data format proposed by SNIA. The predefined stamp data is the specified archer header data in the disk array information.

In one embodiment, the predefined stamp data can be 0xde11de11. While the extracted target byte data of the first four bytes data is 0xde11de11 too, the target byte data agrees with the predefined stamp data, and the target hard disk stores the disk array information, which forms a disk array volume by the disk array card. The disk array information needs to be cleared.

Figure 3:
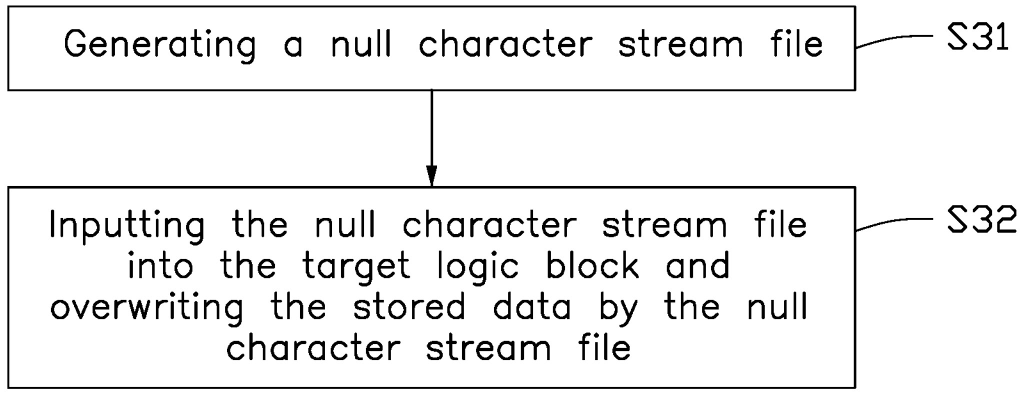
FIG. 3 is a detail flowchart illustrating an embodiment of block S14 of the flowchart in FIG. 1 according to the present disclosure.

FIG. 3 shows a detail flowchart of the block S14. The block S14 further includes the following steps.

In block S31, a null character stream file is generated.

In one embodiment, while clearing the stored data of the target logic block besides directly deleting or formatting the target logic block, the generated null character stream file overwrites the stored data of the target logic block.

In one embodiment, when the system of the computer device for configuring the target hard disk is Linux system, the null character stream file can be provided by/dev/zero. The /dev/zero may be a device file for continuously providing null character stream, thus the null character stream file is provided by the/dev/zero.

In block S32, the null character stream file is inputted into the target hard disk and the stored data is overwrote by the null character stream file.

In one embodiment, when the system of the computer device for configuring the target hard disk is Linux system, the stored data of the target logic block is cleared by an instruction of "dd". The "dd" instruction in the Linux system is configured to read data from a standard input or a file, convert the data according to a predetermined format, and output the converted data to the file, or a device or as a standard output. The null character stream file servers as the input file, which is inputted into the target logic block by the "dd" instruction, for clearing the stored data in an overwriting manner.

Figure 4:
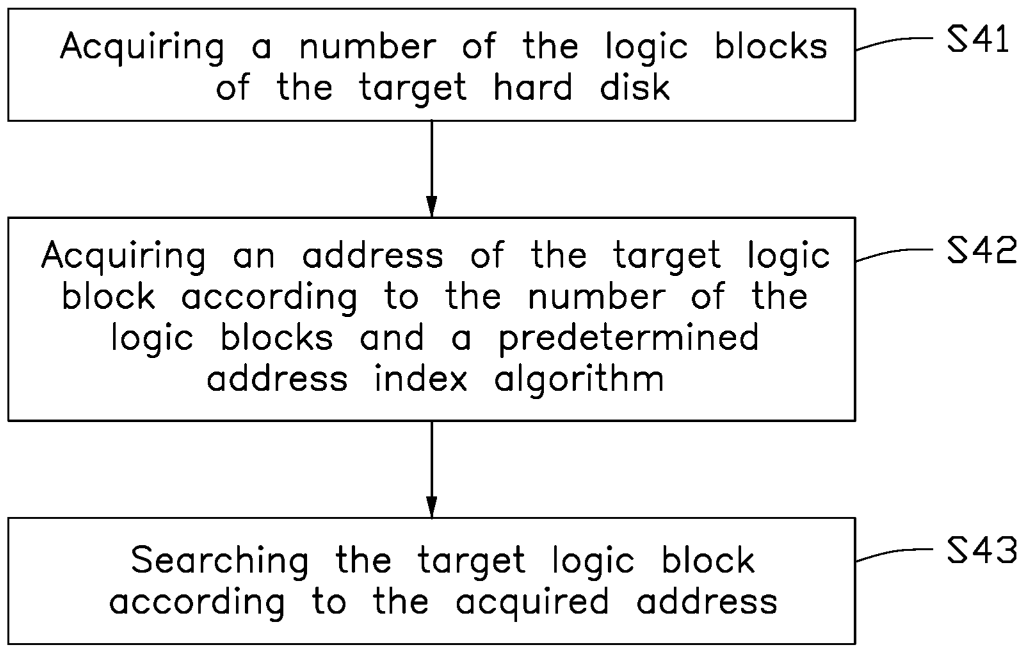
FIG. 4 is a detail flowchart illustrating an embodiment of block S11 of the flowchart in FIG. 1 according to the present disclosure.

FIG. 4 shows a detail flowchart of the block S11. The block S11 further includes the following sub-steps.

In block S41, a number of the logic blocks of the target hard disk is acquired.

In block S42, an address of the target logic address is acquired according to the number of the logic blocks and a predefined address index algorithm.

In block S43, the target logic block is searched according to the acquired address.

In one embodiment, when the system of the computer device for configuring the target hard disk is Linux system, a number of the logic blocks, each of which is in 512 bytes, of the target hard disk is acquired by an instruction of "getsz [device]". The number of the logic blocks minus one as the address of the last target logic block.

Figure 5:
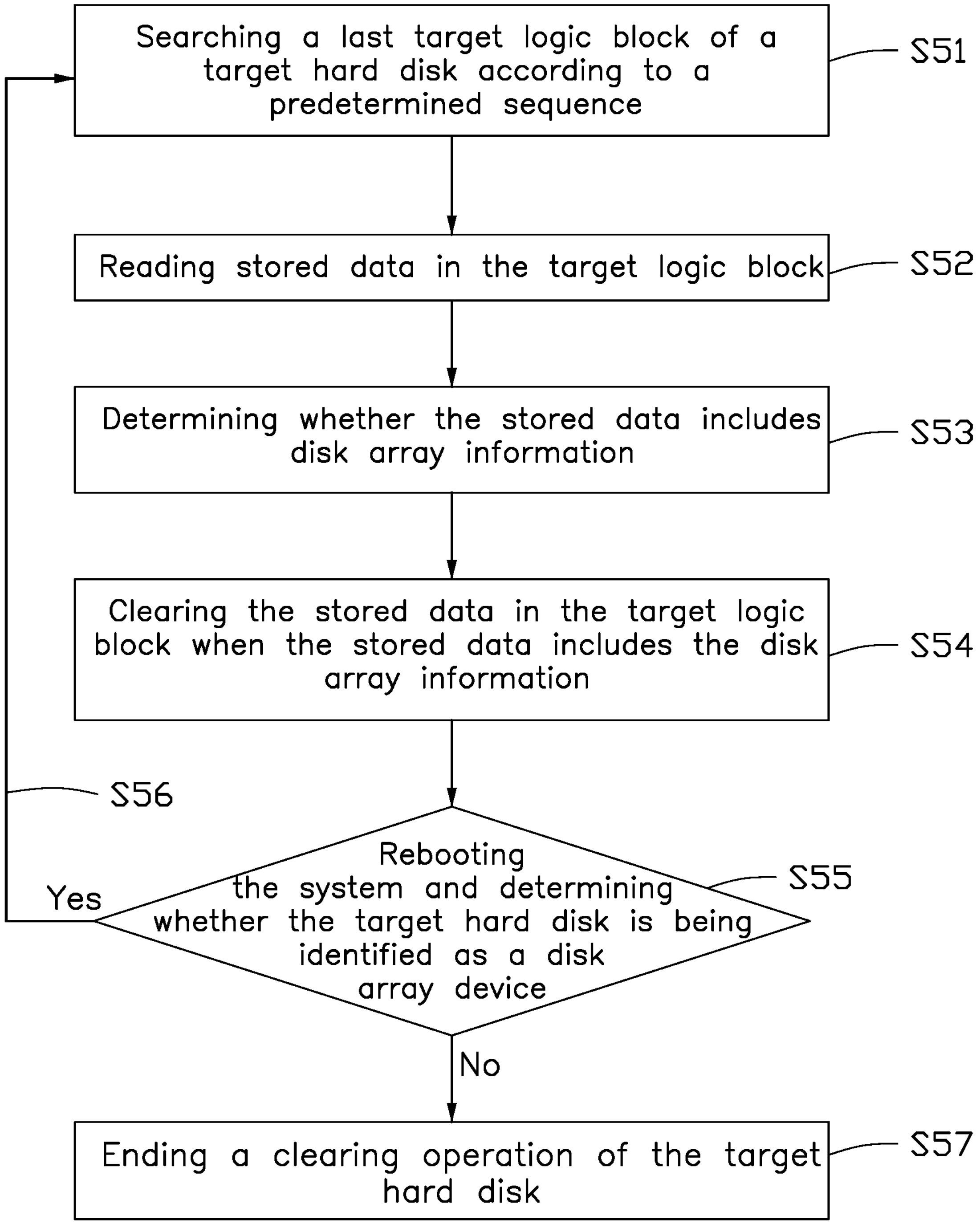
FIG. 5 is a flowchart illustrating a second embodiment of a method of data clearing of a hard disk according to the present disclosure.

FIG. 5 shows a second embodiment of a method of data clearing of a hard disk, the method may comprise at least the following steps, which also may be re-ordered.

In block S51, a last target logic block of a target hard disk is searched according to a predetermined sequence.

The block S51 is the same as the block S1*l*, which will not be repeated here.

In block S52, stored data of the target logic block is read.

The block S52 is the same as the block S12, which will not be repeated here.

In block S53, determining whether the stored data includes disk array information.

The block S53 is the same as the block S13, which will not be repeated here.

In block S54, the stored data of the target logic block is cleared while the stored data includes the disk array information.

The block S54 is the same as the block S14, which will not be repeated here.

In block S55, the system is rebooted and determining whether the target hard disk is being identified as a disk array device.

When the target hard disk is being identified as a disk array device, the procedure returns to the step S51.

In the embodiment, after the stored data of the target hard disk is cleared, the system and the target hard disk are rebooted. After rebooting the system, whether the target hard disk is identified as the disk array device is determined. While the target hard disk includes a complete disk array information, the target hard disk is identified as the disk array device. Thus, the target hard disk identified as the disk array device includes the complete disk array information, and the steps S51-S55 need to be re-executed until the disk array information is invalid. Thus, the target hard disk can be used by other controllers without being affected.

In block S57, a clearing operation of the target hard disk is ended if the target hard disk fails to be identified as the disk array device.

The method of data clearing of a hard disk can be applied to the HBA connected with a plurality of the target hard disks.

In the computer device, the HAB connects with the plurality of hard disks for storing data and computer programs. For data of several target hard disks need to be clear, when the current target hard disk does not includes the disk array information, the next target hard disk is searched by implementing the foregoing method of data clear, thus an efficiency of data clearing to the target hard disks is improved.

Figure 6:
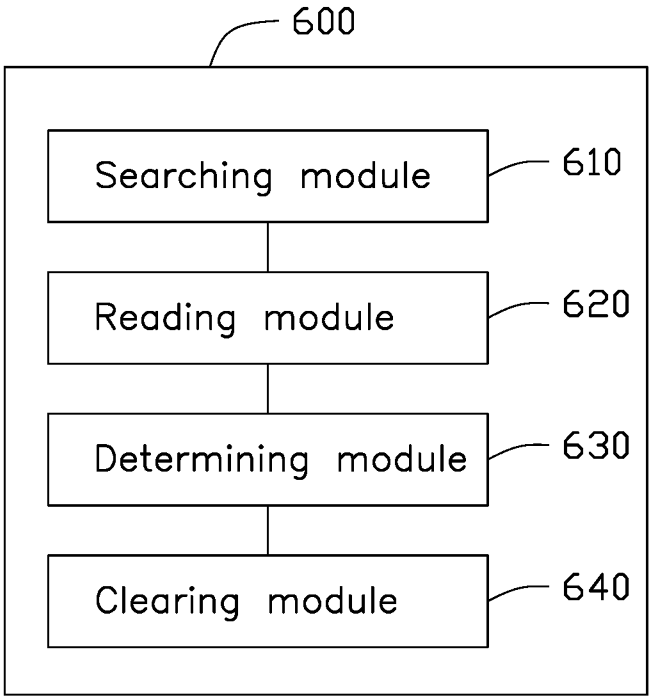
FIG. 6 is diagram illustrating an embodiment of an apparatus for clearing data of a hard disk according to the present disclosure.

FIG. 6 shows the apparatus 600 of data clearing of a hard disk. The apparatus 600 may include a searching module 610, a reading module 620, a determining module 630, and a clearing module 640.

The searching module 610 is configured to search a last target logic block of a target hard disk according to a predetermined sequence.

The reading module 620 is configured to read stored data of the target logic block.

The determining module 630 is configured to determine whether the stored data includes disk array information.

The clearing module 640 is configured to clear the stored data of the target logic block while the stored data includes the disk array information.

In one embodiment, the more detail function of the foregoing modules in the embodiment may refer the foregoing corresponding content, which will not be repeated here.

An embodiment of the present disclosure further provides a computer readable storage medium. The computer readable storage medium stores instructions that, when executed by a computer or a processor, cause the computer or the processor to perform the foregoing method of data clearing of a hard disk. If each component module of the apparatus of data clearing of a hard disk is implemented in the form of a software functional unit and sold or used as an independent product, it can be stored in the computer readable storage medium.

In some embodiments, it may be implemented in whole or in part by software, hardware, firmware, or any combination thereof. When implemented in software, it may be implemented in whole or in part in the form of a computer program product including one or more computer instructions. When computer instructions are loaded and executed on a computer, all or part of the processes or functions according to the embodiments of the present disclosure are generated. The computer may be a general-purpose computer, a special purpose computer, a computer network, or other programmable device. Computer instructions may be stored in a computer-readable storage medium or transmitted from one computer-readable storage medium to another computer-readable storage medium. For example, computer instructions can be transmitted from a website, a computer, a server, or a data center to another website, computer, server, or data center through wired (e.g., coaxial cable, optical fiber, digital subscriber line (i.e., DSL)) or wireless (e.g., infrared, wireless, microwave, and the like). A computer-readable storage medium may be any usable media that can be stored and read by a computer or a data storage device such as a server or a data center, and the like. containing one or more usable media integrations. A usable media can be a magnetic media (e.g., floppy disk, hard disk, magnetic tape), an optical media (e.g., high-density digital video disc, i.e., DVD), or a semiconductor media (e.g., solid state disk, i.e., SSD), and the like.

A person having ordinary skills in the art can appreciate that all or part of the above embodiments may be realized through hardware related to corresponding the computer program. The computer program may be stored in a non-transitory computer-readable medium. When the program is executed by a processor, steps of the above embodiments of the disclosed method may be performed. The storage medium may include a magnetic disk, an optical disk, a read-only memory (ROM), or a random access memory (RAM), and the like. In the case where there is no conflict between the exemplary embodiments, the features of the following embodiments and examples may be combined with each other.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of data clearing of a hard disk, being applicable in an apparatus; the apparatus comprises a storage medium with computer programs and a processor; the processor executes the computer programs to implement the following steps:
   (a) searching a last target logic block of a target hard disk according to a predetermined sequence;
   (b) reading stored data in the target logic block;
   (c) determining whether the stored data comprises disk array information; and
   (d) clearing the stored data in the target logic block when the stored data comprises the disk array information.

2. The method of claim 1, wherein the disk array information comprises a target archer header data; the target archer header data is in a predetermined magnetic data format.

3. The method of claim 1, wherein the step of (c) comprises:
   extracting target byte data from a predetermined position of the stored data; and
   determining whether the target byte data agrees with a predefined stamp data.

4. The method of claim 3, wherein the target byte data is the stored data from a first byte to a fourth byte in the stored data; the predefined stamp data is global flag data in a standard magnetic data format proposed by storage networking industry association (SNIA).

5. The method of claim 1, wherein the step (d) comprises:
   generating a null character stream file; and
   inputting the null character stream file into the target logic block and overwriting the stored data by the null character stream file.

6. The method of claim 1, wherein the step (a) comprises:
   acquiring a number of the logic blocks of the target hard disk;
   acquiring an address of the target logic block according to the number of the logic blocks and a predetermined address index algorithm; and
   searching the target logic block according to the acquired address.

7. The method of claim 1, wherein the method further comprises:
   (e) rebooting the system and determining whether the target hard disk is being identified as a disk array device;
   (f) returning to the step (a) if the target hard disk is being identified as the disk array device; and
   (g) ending a clearing operation of the target hard disk if the target hard disk fails to be identified as the disk array device.

8. The method of claim 1, wherein the predetermined sequence is a reading and writing sequence of the logic blocks after the target hard disk is driven.

9. An apparatus comprises a storage medium and at least one processor; the storage medium stores at least one command; the at least one commands is implemented by the at least one processor to execute functions; the storage medium comprising:
   a searching module configured to search a last target logic block of a target hard disk according to a predetermined sequence;
   a reading module configured to read stored data of the target logic block;
   a determining module configured to determine whether the stored data includes disk array information; and
   a clearing module configured to clear the stored data of the target logic block while the stored data comprises the disk array information.

10. The apparatus of claim 9, wherein the disk array information comprises a target archer header data; the target archer header data is in a predetermined magnetic data format.

11. The apparatus of claim 9, wherein the predetermined sequence is a reading and writing sequence of the logic blocks after the target hard disk is driven.

12. A computer readable non-transitory storage medium, the computer readable non-transitory storage medium stores computer programs, and the computer programs are executed by at least one processor to implement the following steps:
   (a) searching a last target logic block of a target hard disk according to a predetermined sequence;
   (b) reading stored data in the target logic block;
   (c) determining whether the stored data comprises disk array information; and
   (d) clearing the stored data in the target logic block when the stored data comprises the disk array information.

13. The computer readable non-transitory storage medium of claim 12, wherein the disk array information comprises a target archer header data; the target archer header data is in a predetermined magnetic data format.

14. The computer readable non-transitory storage medium of claim 12, wherein the step of (c) comprises:
   extracting target byte data from a predetermined position of the stored data; and
   determining whether the target byte data agrees with a predefined stamp data for judging whether the stored data comprises the disk array information.

15. The computer readable non-transitory storage medium of claim 14, wherein the target byte data is the stored data from a first byte to a fourth byte in the stored data; the predefined stamp data is global flag data in a standard magnetic data format proposed by storage networking industry association (SNIA).

16. The computer readable non-transitory storage medium of claim 12, wherein the step (d) comprises:
   generating a null character stream file; and
   inputting the null character stream file into the target logic block and overwriting the stored data by the null character stream file.

17. The computer readable non-transitory storage medium of claim 12, wherein the step (a) comprises:
   acquiring a number of the logic blocks of the target hard disk;

acquiring an address of the target logic block according to the number of the logic blocks and a predetermined address index algorithm; and searching the target logic block according to the acquired address.

18. The computer readable non-transitory storage medium of claim 12, wherein the processes further:

(e) rebooting the system and determining whether the target hard disk is being identified as a disk array device;

(f) returning to the step (a) if the target hard disk is being identified as the disk array device; and (g) ending a clearing operation of the target hard disk if the target hard disk fails to be identified as the disk array device.

19. The computer readable non-transitory storage medium of claim 12, wherein the predetermined sequence is a reading and writing sequence of the logic blocks after the target hard disk is driven.

* * * * *